Feb. 12, 1935.  E. G. BODEN  1,990,771
LUBRICANT TESTING MACHINE
Filed March 12, 1932  3 Sheets-Sheet 1

INVENTOR:
Ernest G. Boden,
by Can & Can Gravely,
HIS ATTORNEYS

Feb. 12, 1935.  E. G. BODEN  1,990,771
LUBRICANT TESTING MACHINE
Filed March 12, 1932   3 Sheets-Sheet 2

INVENTOR:
Ernest G. Boden,
by Carr Stewart Gravely,
HIS ATTORNEYS.

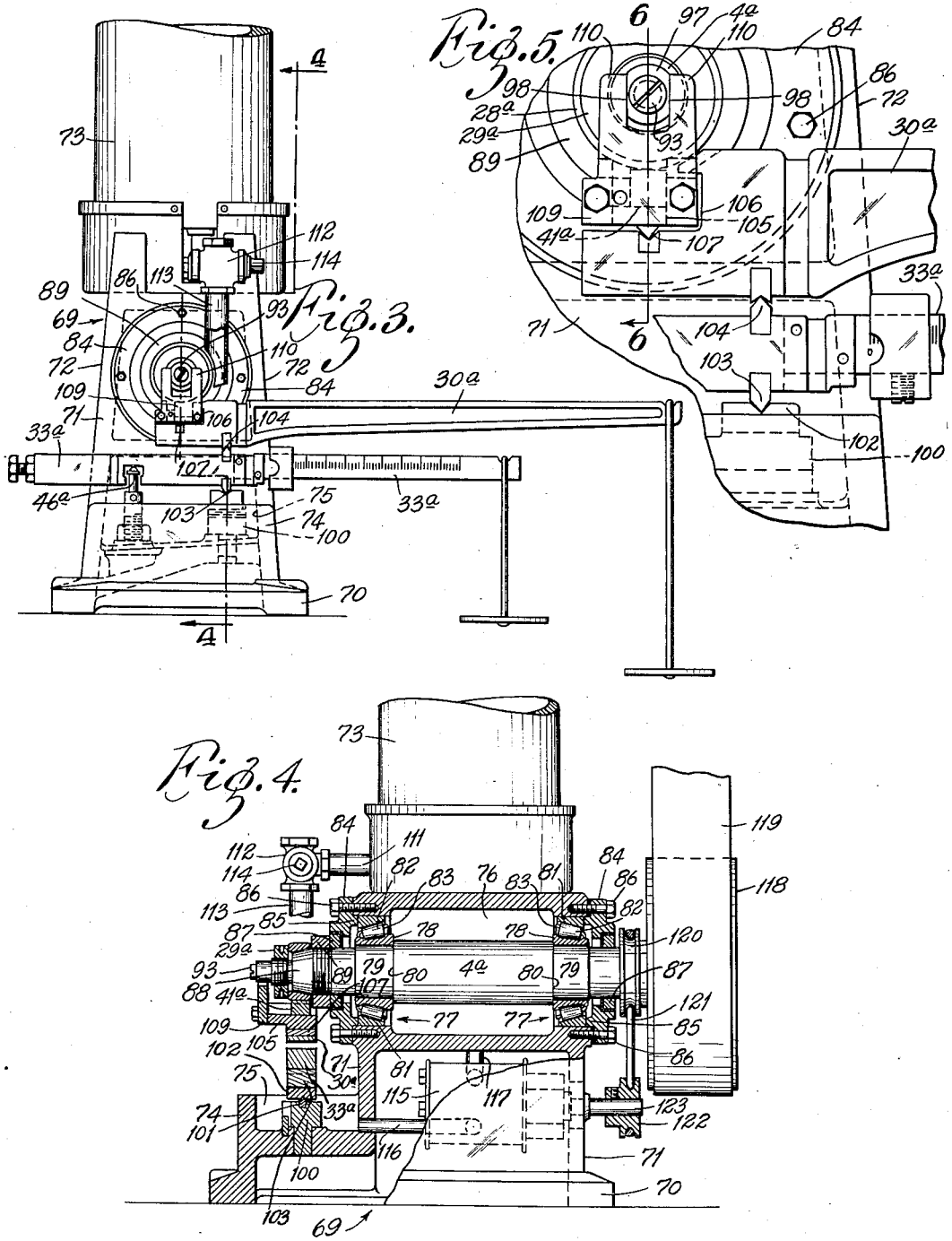

Patented Feb. 12, 1935

1,990,771

UNITED STATES PATENT OFFICE 1,990,771

LUBRICANT TESTING MACHINE

Ernest G. Boden, Canton, Ohio, assignor to The Timken Roller Bearing Company, Canton, Ohio, a corporation of Ohio Application March 12, 1932, Serial No. 598,316

12 Claims. (Cl. 265—10)

My invention relates to a machine for testing comparatively different kinds of lubricants to determine relative values indicating the scuffing and abrasive characteristics of said lubricants. It also relates to a machine for testing different kinds of materials comparatively to determine relative values indicating the resistance of said materials to scuffing and abrasion caused by lubricants; and the principal object of this invention is to provide simple testing apparatus for determining such values.

My invention consists principally in employing a novel arrangement of levers whereby the frictional resistance of a rotating test ring contacting with a special test block, with or without oil interposed between them, can be accurately weighed. It also consists in the parts, combinations and arrangements of parts hereinafter described and claimed.

Figure 2:
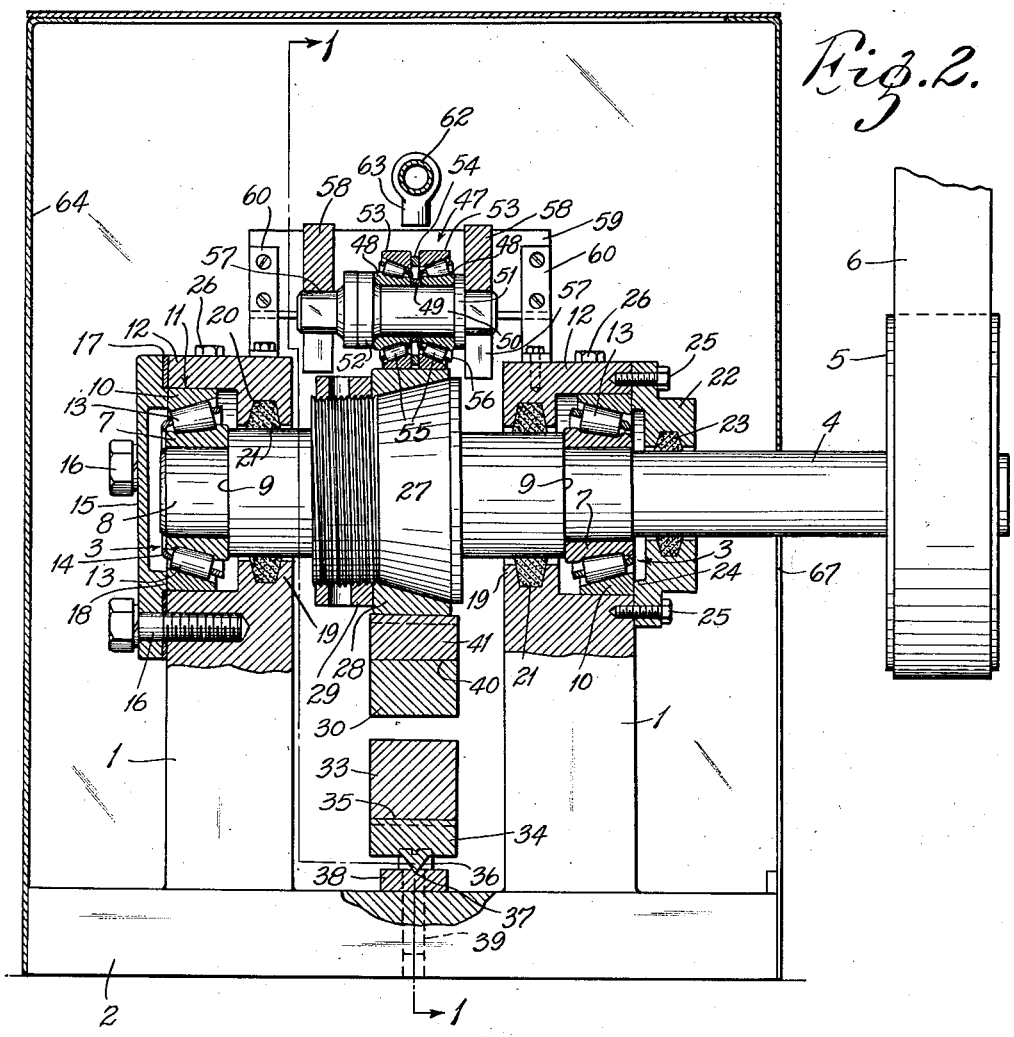
Figure 6:
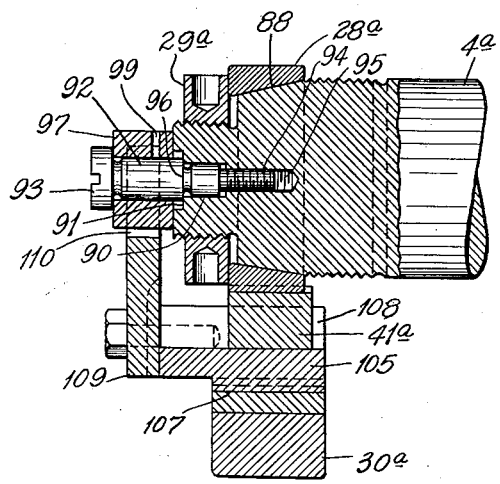

In the accompanying drawings which form part of this specification and wherein reference symbols refer to like parts wherever they occur, Fig. 1 is a side sectional view of one form of testing machine embodying my invention, and it is a view taken along the line 1—1 in Fig. 2, Fig. 2 is a vertical section of the machine taken along the line 2—2 in Fig. 1, Fig. 3 is a front view of a modified form of testing machine embodying my invention, Fig. 4 is a side view, partly in vertical section, of the testing machine shown in Fig. 3, the section being taken on the line 4—4 in Fig. 3, Fig. 5 is a fragmentary view on an enlarged scale of the middle portion of Fig. 3, showing the parts for supporting the test block in contact with the test ring; and Fig. 6 is a vertical section taken along the line 6—6 in Fig. 5.

This application forms a continuation in part of my co-pending application Serial No. 429,873, filed February 20, 1930, for an Improvement in testing machine. In the construction illustrated in Figs. 1 and 2, a pair of adjacent, upright standards 1 are mounted on a suitable base 2, and the tops of said standards are provided with suitable bearings 3 for a rotatable arbor 4. One bearing supports the end of said arbor, whereas the arbor extends through the other bearing and at a suitable distance therefrom, a pulley 5 is mounted on said arbor, and mounted around this pulley is a belt 6 driven by a suitable source of power (not shown).

The bearing supporting the end of the arbor comprises a cone 7 mounted on a reduced portion 8 of said arbor near the end thereof with the larger end of said cone abutting against the shoulder 9 formed by reducing the diameter of said arbor. A cup 10, for cooperating with said cone 7, is mounted in an annular opening 11 in the standard, the top portion of said standard comprising a housing 12 for said bearing. A single series of conical rollers 13, mounted in a suitable cage 14, are interposed between said cone 7 and cup 10, and a closure plate 15 is secured to the outer face of the standard by bolts 16 with shims 17 interposed between said plate and the outer face of said standard. The closure plate 15 is provided with an annular rib 18 that abuts against the larger end of said cup thereby constituting a means for holding the bearing in position, whereas the shims constitute a means for adjusting said bearing, as it is obvious that shims of different thicknesses may be interposed between the plate and standard, or displaced therefrom, to tighten or loosen the bearing. The annular opening 11 for said bearing is provided with an annular rib 19, one side of which is flush with the face of the standard; and said rib is provided with an annular recess 20 for receiving an oil ring 21 in order to seal the bearing.

The other bearing is similar in construction to the end bearing, except that a closure ring 22 provided with an oil ring 23 and an annular rib 24 for engaging the cup 10 is secured to the outer face of the standard by bolts 25 to hold the bearing in position, instead of the closure plate 15 which holds the end bearing in position. The top portion of each upright standard, comprising the housing 12 for each bearing, is split horizontally and transversely to the axis of rotation of said arbor, and the top portions of the standard may be removed from the lower parts thereof by unscrewing bolts 26 which movably hold the housing 12 to the standards, whereby the arbor 4 may be readily removed from its bearings.

Mounted on a conical tapering portion 27 of the arbor between said standards is a test ring 28, the larger end of said ring abutting against a second ring 29, the latter ring having threaded engagement with the arbor thereby holding said test ring firmly on said arbor and causing it to rotate therewith. As the arbor is readily removed from its bearings, it is obvious that the removal of one test ring and the mounting of another during a series of tests can be readily accomplished.

Extending from between the two standards and beneath the test ring is a simple lever 30 (hereinafter termed the test lever), whose arms bear a known relation to each other. Said test lever is fulcrumed on a knife-edge 31 located just inside the front edge of said standards, said knife-edge being provided on the top of a projection 32 extending from a second simple lever 33 (hereinafter termed the friction or weighing lever). The friction lever is fulcrumed on a block 34 provided with a knife-edge 35 in direct alinement with the knife-edge 31 supporting the test lever, and its arms are of such length and weight that said lever is normally balanced horizontally. In order to obtain universal action, said block 34, supporting the friction lever, is provided with a downwardly extending knife-edge 36 which extends parallel with the levers and rests in a flat groove 37 provided in a small block 38 secured to the base 2 of the machine by bolts 39. Mounted in a recess 40 in the top of the test lever so as to have substantially line contact with the test ring is a test block 41, preferably of rectangular shape, but which may be of any other suitable shape if desired; and this test block is held in place by a suitable wedge 42 placed in the recess 40 adjacent to the test block. Obviously, the test block may be readily removed by knocking out the wedge, and it is to be noted that the shape of the wedge will depend upon the shape of the test block used.

Located near the end of the longer arms of both levers are suitable notches 43 adapted to receive hooked handles supporting pans for carrying weights (not shown) and, preferably, the friction or weighing lever is equipped with a pointer 44 which is movable over a scale 45 to exactly determine the horizontal position of said lever; and it is to be noted, in this connection, that a suitable electric device or a suitable optical device, or any other indicating device may be used instead of the pointer and scale.

From the foregoing description, it is obvious that, by placing known calculated weights on the end of the test lever, any desired pressure may be imposed upon the test ring, and also by the system of levers used, the friction of the test ring rotating against the test block will tend to move the test block laterally to exert a force on the projecting knife-edge whereby the resulting moment of said force will oscillate the friction lever. By placing weights therefor on the weighing end of the friction lever, said friction lever will again assume a horizontal position, and the weight required to bring the lever back to its normal position is the weight required to balance the frictional moment.

Preferably, to prevent the levers from joggling around during a test, an adjustment screw mounted on the base 2 has a pin stop 46 for engaging the end of the friction lever opposite the weighing end, said stop providing a means for holding said lever in its normal horizontal position and for keeping it from oscillating when it is not desirable to weigh frictional moments.

Located above the test ring and contacting therewith is a test bearing 47 comprising two adjacent cones 48 each cone tapering from the end to the center of said bearing and spaced apart by a spacer ring 49. The cones are mounted on a suitable shaft 50, the larger end of the cone on one side of said bearing abutting against a shoulder 51 provided on said shaft, whereas the larger end of the opposite cone abuts against a ring 52 having threaded engagement with the shaft to hold the cones in position. Suitable cups 53 spaced apart by a ring 54, cooperate with each cone, and two series of roller bearings 55, mounted in a suitable cage 56, are interposed between said cones and cups. The shaft 50 extends a slight distance on each side of the bearing and engages two opposite slots 57 provided in two cantilevers 58 each cantilever being fulcrumed on their top side by engaging a knife edge 59 extending from suitable brackets 60 mounted on the standards 1. The normal weight of the two cantilevers and the slots engaging the bearing shaft hold the bearing on top and in contact with the test ring, and the ends of said levers are provided with notches 61 whereby weights may be applied to said levers to load the bearing.

An oil inlet pipe 62 provided with a suitable valve extends over the top of the test bearing between the two cantilevers and then in an arcuate path to a point close to the contacting part of the test block and the test ring. A tap 63 is also provided in said inlet pipe directly above the test bearing for lubricating the same. The upright standards 1, together with the arbor 4, are enclosed by a removable cover 64 having an opening 65 for the oil inlet pipe; a rectangular opening 66 for the levers; and a suitable opening 67 for the pulley shaft portion of the arbor. Extending through the base 2 is a hole 68 forming an oil outlet for oil which has been fed to the machine and then dripped on to the base, and this oil may be retained for inspection, or it may be pumped back through the inlet pipe and reused.

The other form of my oil testing machine, illustrated in Figs. 3 to 6, inclusive, is supported on a stand, preferably of integral construction, and generally designated as 69. This stand comprises a base portion 70 supporting substantially flat, parallel, front and rear walls 71 and inclined side walls 72, and an oil tank 73 is seated on the top of the stand. A portion 74 of the base of the stand extends outwardly from the front wall thereof, and this portion is recessed to form a rectangular shaped oil reservoir 75. The supporting stand 69 has a horizontally disposed opening 76 extending through its central portion, and disposed in this opening is the testing arbor 4a having one end terminating above the oil reservoir; and antifriction bearings 77 are interposed between the arbor 4a and the wall of the opening near the front and rear walls of the stand, respectively.

Each bearing 77 comprises a cone 78 mounted on a reduced portion 79 of the arbor with its larger end abutting against a shoulder 80 formed by reducing the diameter of the arbor. A cup 81, for cooperating with the cone 78, is mounted in the opening, and rollers 82, mounted in a suitable cage 83, are interposed between the cones and cups. The diameter of the arbor is further reduced near each end, and surrounding these reduced portions are annular closure rings 84 having annular flanges 85 abutting against the larger ends of the cups, and said closure rings are secured to the walls of the supporting stand by means of bolts 86. Suitable sealing means 87 are interposed between the inner periphery of the closure rings and the arbor.

The arbor 4a, near its front end, is tapered to form a conical portion 88 for receiving the test ring 28a. Another ring 89 having threaded engagement with the arbor is mounted thereon between the tapering portion thereof and the adjacent bearing. The diameter of the arbor is further reduced near the extreme end thereof, and mounted on this reduced portion and having threaded engagement with the arbor is another ring 29a abutting against the larger end of the test ring for holding the same firmly on the arbor.

The arbor has a centrally located, circular hole 90 in its end whose diameter is decreased near the end of the arbor to form an annular shoulder 91. A pin 92, having an enlarged head portion 93, fits into the hole 90, and said pin 92 has a threaded end portion 94 extending into a threaded hole 95 communicating with the hole 90. The diameter of the pin 92 is reduced near its center to form an annular shoulder 96 which abuts against the annular shoulder 91 in the hole 90; and rotatably mounted on said pin between the enlarged head portion and the end face of the arbor is a collar 97 having two opposite, flat, and parallel side portions 98. The collar 97 also has a radially disposed lubricant duct 99.

Extending upwardly from the bottom of the oil reservoir 75 is a small pedestal 100 having an upright projection which is tapered to form a knife-edge 101 extending parallel to the front wall of the supporting stand; and a small block member 102 is fulcrumed on this knife-edge. The weighing lever 33a has a transverse projection on its underside which is tapered to form a knife-edge 103, and this knife-edge rests in a transverse groove in the top of the block member 102 for supporting the lever. Extending from the top of the weighing lever 33a is a transverse projection which is tapered to form a knife-edge 104 extending parallel to and directly above the bottom knife-edge 103; and supported on this knife-edge 104 is the test lever 30a having a transverse groove for accommodating the knife-edge.

Both the test lever 30a and the weighing lever 33a are adapted to operate in the same manner as the test lever 30 and the weighing lever 33, respectively, of the other form of my invention. The test lever 30a and the weighing lever 33a are provided with notches for receiving weight pan handles similar to the notches in the levers 30 and 33, and a pin stop 46a is arranged to control the position of the weighing lever; but, in this form of my invention, instead of supporting the test block on the test lever, the test lever 30a has an auxiliary supporting block 105 fulcrumed thereon which supports the test block 41a in position to contact with the test ring. The test lever 30a is provided with a recess 106 in its top adjacent to the end of its shorter arm for receiving the auxiliary supporting block 105, and a groove is provided in said recess for accommodating a knife-edge 107 at the end of a transverse projection extending from the underside of the auxiliary supporting block 105, said knife-edge 107 extending parallel to the axis of rotation of the arbor 4a. The supporting block 105 is provided with a recess 108 in its top for receiving the test block 41a, and the test block is held in said recess by a wedge, or the like, in the same manner that the test block 41 is held on the lever 30 in the other form of my invention.

Secured to the forward face of the auxiliary supporting block 105 is an upright plate member 109 having a U-shaped end defined by upstanding legs 110 which extend on each side of the arbor 4a; and the inner edges of these legs engage the flat side portions of the collar 97 which is loosely mounted on the end of the arbor 4a for preventing rotation of the collar with respect to the supporting block. Obviously, by supporting the test block 41a in such manner, it may move laterally with respect to the test ring so that it will maintain contact throughout the entire line of contact thereof, but it is constrained so that it can move circumferentially only with respect to the test ring when the test lever moves a slight distance longitudinally during the course of a test.

Extending outwardly from the oil tank is a horizontally disposed pipe 111 having an elbow 112 fitted on its end for supporting a vertically disposed pipe 113 arranged to supply oil to the test parts; and the elbow may be provided with a suitable valve mechanism 114 for regulating the flow of oil to the test parts. Mounted in the bottom of the stand is an oil pump 115 which is provided with an intake pipe 116 communicating with the bottom of the oil reservoir and a discharge pipe 117 communicating with the oil tank on top of the stand for pumping oil from the reservoir back up into the oil tank.

The opposite end of the arbor from that which supports the test ring is provided with a pulley wheel 118 having a belt 119 mounted thereon which is driven by any suitable source of power (not shown), and fixed on the arbor between the pulley wheel 118 and the adjacent bearing is a grooved pulley 120 having a cable 121 mounted thereon which is mounted around another grooved pulley 122 fixed on the end of a horizontal shaft 123 operatively connected to the pump for driving the same.

The abrasive quality of different kinds of lubricants can only be determined by the form of testing machine shown in Figs. 1 and 2. The lubricant to be tested is supplied by the top tap of the inlet pipe to thoroughly lubricate the test bearing contacting with the top part of the test ring. The arbor is then rotated for a specified length of time and the amount of wear of the bearings, determined by weighing or measuring, will be an indication of the abrasive quality of the lubricant used.

Both forms of the testing machines are adapted to determine the scuffing quality of lubricants and the operation of the testing machines for determining such qualities is as follows:

The lubricant to be tested is freely supplied to the contacting part of the test block and the test ring, and a known load is placed on the end of the test lever to obtain the desired pressure on the test block. The arbor is then rotated and the friction of the test ring on the test block produces a moment which tends to raise the end of said friction lever. At the end of a specified test period, weights are then applied to the end of the friction lever until the friction lever just moves from horizontal position. This value together with the depth (preferably measured with a delicate micrometer) that the test ring has worn into the test block, or by weighing the test block before and after test, are tabulated.

By making the test block of many sides, or round, several tests can be conducted on the same test block. If the friction load becomes greater as the test proceeds, this is a definite indication of scratching or scoring. The roughness of the test block can be detected, either by the naked eye, a microscope or by special apparatus, such as, for example, apparatus of the type disclosed in the co-pending application of Floyd A. Firestone, et al., Serial No. 520,756 for Apparatus for determining the roughness of surfaces.

It is obvious that by using a single lubricant and different kinds of material for the test block, certain values could be obtained which would be an indication of the comparative resistance of that material to abrasion and wear. Also the loads applied at the end of the test lever may be varied so as to produce the exact pressure at which the lubricant or material being tested is to be subjected to in practice. It is also obvious that a very simple and expedient test for the scuffing quality of different kinds of lubricants may be made, as the test piece when beginning to roughen or scuff will cause rapid oscillations of the friction lever, the magnitude and irregularity of said oscillations being an indication as to what extent the surface of the test block is being roughened.

Obviously, the constructions hereinabove described admit of considerable variations without departing from the spirit of my invention; accordingly, I do not wish to limit my invention to the precise constructions shown and described.

What I claim is:-

1. In a testing machine, a rotatably mounted member adapted to carry a test ring, a pivotally mounted lever adapted to oscillate about a longitudinal and transverse axis, and a second lever fulcrumed on said first mentioned lever and adapted to support a test member in position to contact with the test ring.

2. A testing machine comprising a base having a support thereon, a rotatable member mounted on said support, means provided on said rotatable member for mounting a test member thereon for rotation therewith, a lever pivotally mounted on said base for longitudinal and transverse oscillation, a second lever fulcrumed on said first mentioned lever for oscillation in the plane of longitudinal oscillation thereof, and means provided on said second lever for supporting a test block in position to contact with said test ring.

3. A testing machine comprising a base having a support extending therefrom, a rotatable member mounted on said support, a test ring mounted on said rotatable member and rotatable therewith, a test block in position to contact with said test ring, a lever pivotally mounted on said base for oscillation about a longitudinal and transverse axis, and a second lever fulcrumed on said first mentioned lever and having its axis of oscillation parallel to that of the transverse axis of oscillation of said first mentioned lever, said second lever supporting said test block.

4. A testing machine comprising a base, a block fulcrumed on said base, a lever fulcrumed on said block and having its axis of oscillation at right angles to the axis of oscillation of said block, a second lever fulcrumed on said first mentioned lever and having its axis of oscillation parallel to the axis of rotation of said first mentioned lever, a test block mounted on said second lever, a support extending from said base, a rotatable member mounted on said support, and a test ring mounted on said rotatable member for rotation therewith and in position to contact with said test block.

5. A testing machine comprising a supporting stand, a rotatable member mounted thereon for carrying a test member, a simple weighing lever fulcrumed on said stand, a second lever fulcrumed on said first mentioned lever, with its fulcrum axis located substantially directly above that of said weighing lever, and a member fulcrumed on said second lever with its fulcrum axis disposed parallel to and in a vertical plane passing through the axis of the rotatable member for supporting another test member in position to contact with the other test member.

6. A testing machine comprising a supporting stand, a rotatable arbor mounted thereon, a test ring mounted on said arbor for rotation therewith, a lever fulcrumed on said stand, a second lever fulcrumed on said first mentioned lever, a block member fulcrumed on said second lever for supporting a test block in position to contact with the said test ring, a guiding member rotatably mounted in axial alinement with said arbor, and means provided on said supporting block member and cooperating with said guiding member for constraining the test block to move circumferentially with respect to said arbor.

7. In a testing machine, a rotatable arbor adapted to carry a test ring, a pivotally mounted lever, a block member fulcrumed on said pivotally mounted lever and adapted to support a test block in position to contact with said test ring, a collar rotatably mounted on said arbor, and a member fixed to said supporting block member and engaging said collar for preventing said block member from changing its angular position with respect to said collar in a plane perpendicular to the axis of rotation of said arbor.

8. In a testing machine, a rotatable arbor adapted to receive a test ring, a pivotally mounted lever, a supporting block fulcrumed on said pivotally mounted lever and adapted to support a test block in position to engage the test ring, a collar having flat side portions rotatably mounted on said arbor, and a plate member secured to said block member and having a U-shaped end portion whose legs extend on each side of said collar and engage the flat side positions thereof.

9. In a testing machine, a rotatably mounted arbor adapted to receive a test ring, a pivotally mounted block member for supporting a test block in position to contact with the test ring, said block member having its axis of oscillation parallel to the axis of rotation of said arbor, a collar having flat side portions opposite each other loosely mounted on said arbor, and a plate member secured to said block member and having a U-shaped end portion whose legs extend on each side of said collar and engage the flat side portions thereof.

10. An oil testing machine comprising an upright stand having a horizontally disposed opening therethrough, an oil reservoir formed on said stand below the opening therethrough, a shaft extending through said opening adapted to receive a test ring on its end above the top of said reservoir, roller bearings interposed between said shaft and the walls of said opening, a block member pivotally mounted in the bottom of said reservoir, a lever pivotally mounted on said block member, a second lever pivotally mounted on said first mentioned lever, a second block member pivotally mounted on said second lever and adapted to support a test block in position to contact with the test ring on the arbor, an oil tank mounted on the top of said stand, a pipe communicating with said tank for supplying oil between the test ring and test block, a pump mounted in the bottom of said stand and having an intake pipe communicating with said oil reservoir and a discharge pipe communicating with said oil tank for pumping oil from said reservoir to said tank, power transmitting means connecting said arbor and said pump, and means for driving said arbor.

11. In a testing machine, a rotatably mounted member adapted to carry a test ring, a lever, and a second lever mounted on said first mentioned lever and adapted to support a test member in position to contact with the test ring, one of said levers being adapted to oscillate about a longitudinal and transverse axis.

12. In a testing machine, a rotatably mounted member adapted to carry a test ring, an oscillatively mounted member, a member fulcrumed on said oscillatively mounted member and adapted to support a test piece in position to contact with said test ring, a collar rotatably mounted in axial alinement with said rotatably mounted member, and means provided on said test piece supporting member and cooperating with said collar for constraining the test piece to move circumferentially around said test ring.

ERNEST G. BODEN.